United States Patent [19]

Ekiner et al.

[11] Patent Number: 5,248,319
[45] Date of Patent: Sep. 28, 1993

[54] GAS SEPARATION MEMBRANES MADE FROM BLENDS OF AROMATIC POLYAMIDE, POLYMIDE OR POLYAMIDE-IMIDE POLYMERS

[75] Inventors: Okan M. Ekiner; John W. Simmons, both of Wilmington, Del.

[73] Assignee: E. I. Du Pont de Nemours and Company, Wilmington, Del.

[21] Appl. No.: 940,192

[22] Filed: Sep. 2, 1992

[51] Int. Cl.⁵ .................. B01D 53/22; B01D 71/64
[52] U.S. Cl. ...................... 95/54; 95/55; 96/14
[58] Field of Search ............... 55/16, 68, 158

[56] References Cited

U.S. PATENT DOCUMENTS

| Re. 30,351 | 7/1980 | Hoehn et al. | 55/16 |
|---|---|---|---|
| 3,822,202 | 7/1974 | Hoehn | 210/23 |
| 3,899,309 | 8/1975 | Hoehn et al. | 55/16 |
| 4,240,914 | 12/1980 | Iwama et al. | 210/500 |
| 4,307,135 | 12/1981 | Fox | 427/244 |
| 4,358,378 | 11/1982 | Iwama et al. | 210/500 |
| 4,378,324 | 5/1983 | Makino et al. | 264/41 |
| 4,378,400 | 3/1983 | Makino et al. | 428/220 |
| 4,385,084 | 5/1983 | Iwama et al. | 427/244 |
| 4,420,568 | 12/1983 | Wang et al. | 436/536 |
| 4,440,643 | 4/1984 | Makino et al. | 55/158 X |
| 4,460,526 | 7/1984 | Makino et al. | 264/41 |
| 4,474,662 | 10/1984 | Makino et al. | 55/158 X |
| 4,474,663 | 10/1984 | Nakajima et al. | 210/635 |
| 4,474,858 | 10/1984 | Makino et al. | 55/158 X |
| 4,485,056 | 11/1984 | Makino et al. | 264/41 |
| 4,485,140 | 11/1984 | Gannett et al. | 428/260 |
| 4,512,893 | 4/1985 | Makino et al. | 55/158 X |
| 4,523,893 | 6/1985 | Johst et al. | 417/68 |
| 4,528,004 | 7/1985 | Makino et al. | 55/158 |
| 4,636,314 | 1/1987 | Beuhler et al. | 55/158 X |
| 4,690,873 | 9/1987 | Makino et al. | 55/158 X |
| 4,696,994 | 9/1987 | Nakajima et al. | 528/176 |
| 4,705,540 | 11/1987 | Hayes | 55/16 |
| 4,714,482 | 12/1987 | Polak et al. | 55/158 |
| 4,717,393 | 1/1988 | Hayes | 55/16 |
| 4,717,394 | 1/1988 | Hayes | 55/16 |
| 4,725,642 | 2/1988 | Gannett et al. | 524/600 |
| 4,758,875 | 7/1988 | Fujisaki et al. | 357/72 |
| 4,830,640 | 5/1989 | Nakamura et al. | 55/158 |
| 4,832,713 | 5/1989 | Yamada et al. | 55/158 |
| 4,838,900 | 6/1989 | Hayes | 55/16 |
| 4,851,505 | 7/1989 | Hayes | 528/353 |
| 4,880,442 | 11/1989 | Hayes | 55/16 |
| 4,897,092 | 1/1990 | Burgoyne, Jr. et al. | 55/158 X |
| 4,912,197 | 3/1990 | Hayes | 528/353 |
| 4,929,405 | 5/1990 | Kohn | 55/16 X |
| 4,931,539 | 6/1990 | Hayes | 528/353 |
| 4,932,982 | 6/1990 | Hayes | 55/158 X |
| 4,932,983 | 6/1990 | Hayes | 55/16 |
| 4,935,490 | 6/1990 | Hayes | 528/353 |
| 4,948,400 | 8/1990 | Yamada et al. | 55/158 |
| 4,952,220 | 8/1990 | Langsam et al. | 55/158 |
| 4,954,144 | 9/1990 | Burgoyne, Jr. et al. | 55/158 X |
| 4,968,331 | 11/1990 | Sakashita et al. | 55/158 |
| 4,975,190 | 12/1990 | Sakashita et al. | 55/158 X |
| 4,981,497 | 1/1991 | Hayes | 55/16 |
| 4,983,191 | 1/1991 | Ekiner et al. | 55/158 |
| 4,988,371 | 1/1991 | Jeanes et al. | 55/158 X |
| 4,997,462 | 3/1991 | Nakatani et al. | 55/158 X |
| 5,009,679 | 4/1991 | Angus et al. | 55/158 X |
| 5,015,270 | 5/1991 | Ekiner et al. | 55/16 |

(List continued on next page.)

FOREIGN PATENT DOCUMENTS

| 0321638 | 6/1989 | European Pat. Off. | 55/158 |
|---|---|---|---|
| 0410793 | 1/1991 | European Pat. Off. | 55/16 |
| 60-022902 | 2/1985 | Japan | 55/158 |
| 60-082103 | 5/1985 | Japan | 55/158 |
| 62-074410 | 4/1987 | Japan | 55/158 |
| 62-074411 | 4/1987 | Japan | 55/158 |
| 62-114611 | 5/1987 | Japan | 55/158 |
| 62-163712 | 7/1987 | Japan | 55/158 |

(List continued on next page.)

Primary Examiner—Robert Spitzer
Attorney, Agent, or Firm—Cary A. Levitt

[57] ABSTRACT

The present invention provides for gas separation membranes with superior gas transport properties made from a blend of certain polymers. In particular, certain alkyl substituted aromatic polyimides, polyamides or polyamide-imides are blended with certain aromatic polyimides to provide a gas separation membrane with superior productivity and good selectivity.

5 Claims, 1 Drawing Sheet

U.S. PATENT DOCUMENTS

| | | | |
|---|---|---|---|
| 5,032,149 | 7/1991 | Hayes | 55/16 |
| 5,034,027 | 7/1991 | Tien et al. | 55/158 X |
| 5,042,992 | 8/1991 | Blinka et al. | 55/158 X |
| 5,042,993 | 8/1991 | Meier et al. | 55/158 X |
| 5,045,093 | 9/1991 | Meier et al. | 55/158 X |
| 5,055,116 | 10/1991 | Kohn et al. | 55/16 |
| 5,067,970 | 11/1991 | Wang et al. | 55/158 X |
| 5,071,452 | 12/1991 | Avrillon et al. | 55/158 X |
| 5,074,891 | 12/1991 | Kohn et al. | 55/158 X |
| 5,076,816 | 12/1991 | Avrillon et al. | 55/158 X |
| 5,076,817 | 12/1991 | Hayes | 55/158 X |
| 5,080,698 | 1/1992 | Krizan | 55/158 |
| 5,085,676 | 2/1992 | Ekiner et al. | 55/158 |
| 5,085,774 | 2/1992 | Ekiner et al. | 55/158 X |
| 5,112,941 | 5/1992 | Kasai et al. | 55/158 X |
| 5,178,650 | 1/1993 | Hayes | 55/158 X |
| 5,178,940 | 1/1993 | Matsumoto et al. | 55/158 X |

FOREIGN PATENT DOCUMENTS

| | | | |
|---|---|---|---|
| 63-091122 | 4/1988 | Japan | 55/16 |
| 63-166415 | 7/1988 | Japan | 55/158 |
| 61-194905 | 8/1989 | Japan | 55/158 |
| 2-222717 | 9/1990 | Japan | 55/158 |
| 2244997 | 12/1991 | United Kingdom | 55/158 |

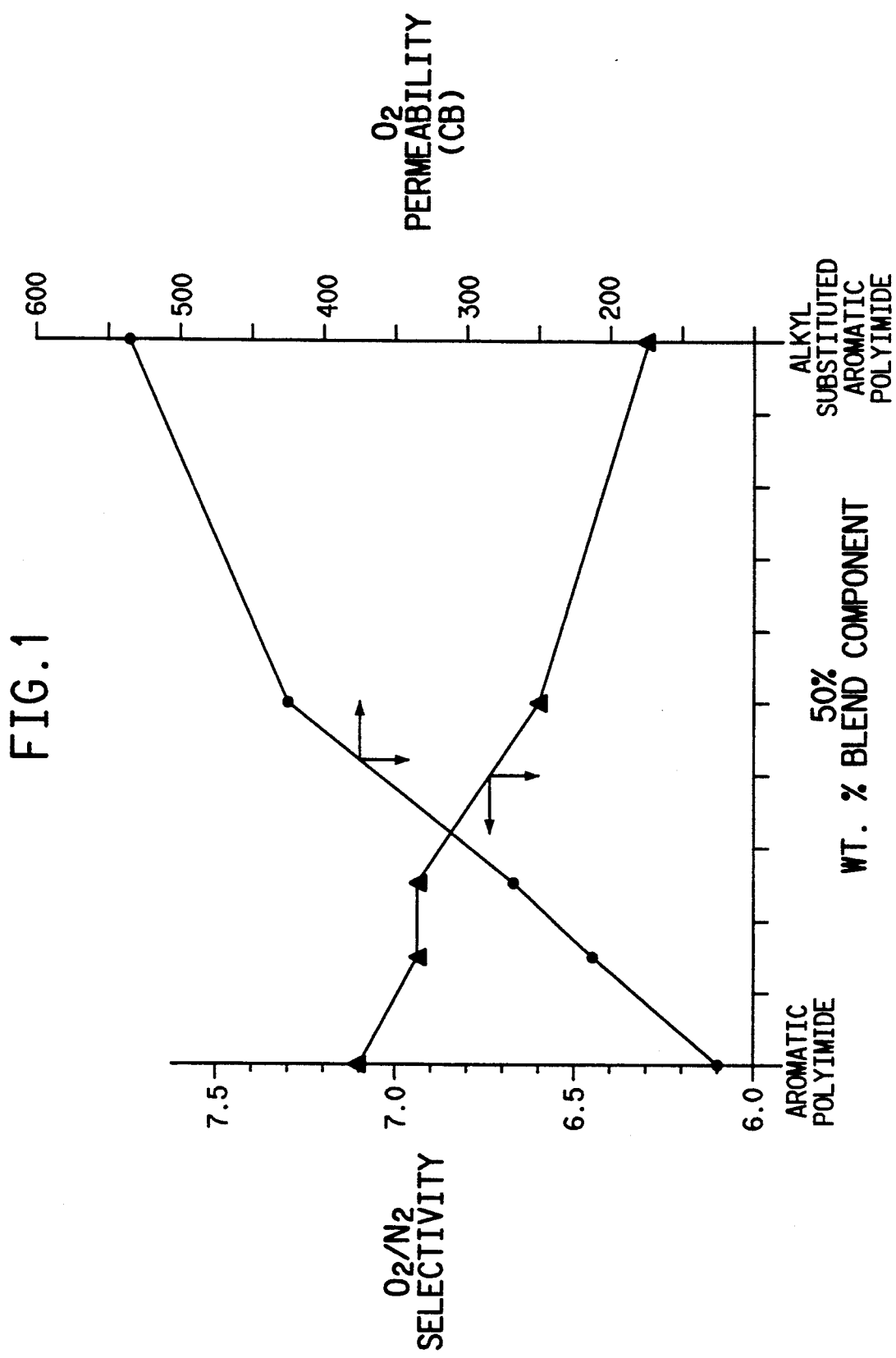

GAS SEPARATION MEMBRANES MADE FROM BLENDS OF AROMATIC POLYAMIDE, POLYMIDE OR POLYAMIDE-IMIDE POLYMERS

FIELD OF THE INVENTION

The present invention relates generally to gas separation membranes cast from a polymer blend. More specifically, the invention relates to gas separation membranes, fabricated from a blend of aromatic polyimide, polyamide and polyamide-imide polymers. The precise gas transport properties of the membrane may be adjusted based on the blending of the specific polymer components.

BACKGROUND OF THE INVENTION

It is well known to employ permeable membranes to separate or selectively enrich a gas mixture. It is also generally known that gas separation membranes may be cast from polymers. The separation of gas components by polymer membranes is thought to depend on chemical affinities, kinetics and structural characteristics; it being known generally that rubbery polymers are characterized by high diffusion and relatively low selectivity while glassy polymers are characterized by lower diffusion and higher selectivities.

Polymer blending has traditionally been thought to be either problematic or of no benefit in the membrane field, primarily because different polymers are generally not miscible with one another. Those few polymers which are thought to be miscible offer no blending advantage in the membrane field because of various reasons, including difficulty in blending, poor mechanical properties, limited range of gas transport properties, and complex relationships between blend composition and gas transport properties.

U.S. Pat. No. 5,055,116 describes a blend of aromatic polyimides, in which the blending of the polymer components is adjusted to achieve certain permeability and selectivity of a polymer membrane. The final properties of a new polymer membrane may be predicted so that a membrane with those desired final properties can then be manufactured.

U.S. Pat. No. 5,055,116 indicates that the gas transport properties of the membrane prepared from the polyimide blends are predictable and the membrane may be "engineered" to achieve the desired final properties. To the contrary, the gas transport properties of the present invention are unpredictable and surprisingly good.

SUMMARY OF THE INVENTION

The present invention provides for gas separation membranes made from a blend of polyimide, polyamide and polyamide-imide polymers. The gas permeability and selectivity of these membranes is superior. The inventive membranes prepared from the blends of this invention are extremely useful in separation processes involving, for example, $H_2$, $N_2$, $CH_4$, $CO$, $CO_2$, $He$, and $O_2$, by virtue of the high permeability and selectivity exhibited by the polymer blends.

SUMMARY OF FIGURES

FIG. 1 is a graph showing the productivity and selectivity values of nitrogen and oxygen as a function of the composition of a blend of an alkyl-substituted polyimide and an aromatic polyimide.

DETAILED DESCRIPTION OF THE INVENTION

The present invention provides for gas separation membranes made from a miscible blend of polymers. The polymers employed in the present invention have different molecular structures and different gas permeability and selectivity properties when formed into a membrane, which, when blended, provide a membrane with surprising and superior gas permeability and selectivity.

In particular, the present invention involves the blending of two types of polymers. The first type of polymer is an alkyl-substituted polyimide, polyamide or polyamide-imide. The second type is an aromatic polyimide. The polymers may be mixed in any ratio to achieve the desired properties of the membrane, preferably up to 75% type 1 polymer and up to 75% type 2 polymer.

The blend miscibility of the polymers may be confirmed by the presence of single composition dependent glass transition temperature lying between those of the constituent blend components. Differential Scanning Calorimetry was used to measure glass transition temperature.

Polyimide materials useful as the first type of polymer in the present invention contain the repeating unit:

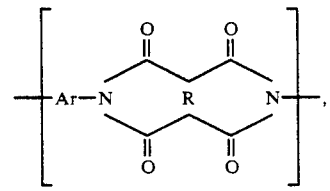

where —Ar— is 0%-99% of any aromatic diamine moiety and 1-100% of an aromatic diamine moiety having the following formula:

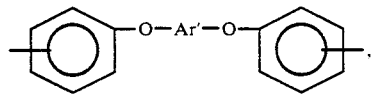

where —Ar'— is

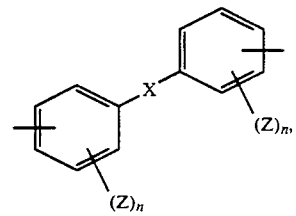

where X=nothing or R', preferably nothing. —R'— is

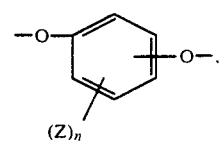

-continued

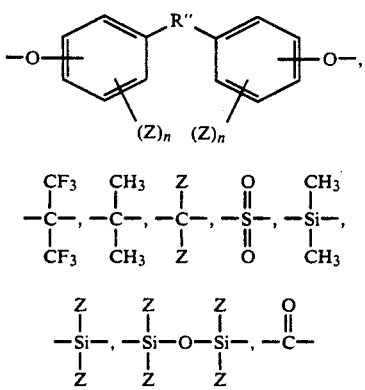

or mixtures thereof, where Z is independently —H, alkyl groups having 1 to 6 carbon atoms, aromatic groups having 6 to 12 carbon atoms, or halogen groups such as —F, —Cl, —Br, or —I, where n is an integer from 0 to 4. Preferably, Z is a tertiary butyl group and n=1. R'' is

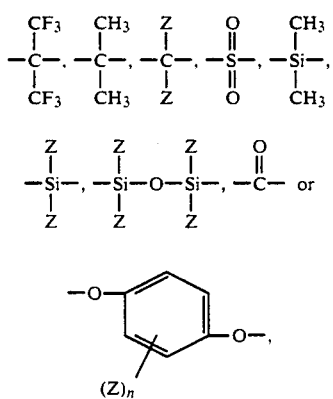

or mixtures thereof.

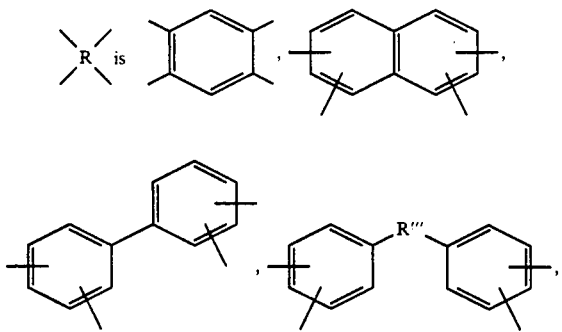

or mixtures thereof; where R''' is

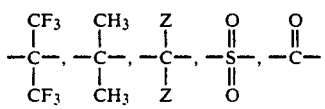

or mixtures thereof.

In general, the polyimides of this invention have a weight average molecular weight within the preferred range of from about 23,000 up to about 400,000 and more preferably from about 50,000 up to about 280,000.

In the preferred process for preparing the polyimides of this invention, approximately equimolar quantities of a dianhydride and the diamine are reacted by well-established procedures known in the art. In general, this process involves the polycondensation of the diamine and the dianhydride followed by the dehydration of the resulting polyamic acid to form a polyimide.

Preferably, the diamine is first dissolved in a polymerization solvent medium and the dianhydride is then gradually added portionwise under continuous agitation. After the addition of all of the monomer, the concentration of the reactants should be such that a solution concentration within the range of about 10 to about 30% by weight (preferably about 20% by weight) is achieved. Additional solvent may be added if necessary to achieve this level.

The solvents which may be used in the polymerization process are organic solvents, preferably polar aprotic, whose functional groups do not react with either the dianhydride or diamine reactant to any appreciable extent, and in which either the dianhydride or diamine, preferably both, and the polymer are soluble. Examples of suitable solvents include N,N-dimethylformamide or N,N-dimethylacetamide; dimethylsulfoxide, N-methylpyrrolidone; gamma-butyrolactone; pyridine; diglyme; and like materials as well as mixtures of such solvents.

Polymerization is conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 2 to about 20 hours. The polyamic acid may then be converted to the polyimide by one of several technques known in the art, for example, by heating the polyamic acid solution until imidization is substantially complete, or by combining the polyamic acid solution and a dehydrating agent, with or without catalyst, and optionally heating the resulting mixture until imidization is complete. The polyimide may then be recovered from solution by precipitation with any suitable non-solvent (e.g., methanol or water) and washed with additional non-solvent.

The resulting polyimides may then, if desired, be blended using conventional solution blending technology to yield a blend having specifically tailored properties.

Polyamide materials useful in the present invention contain the repeating unit:

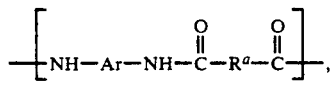

where Ar is defined above and $R^a$ is any aromatic diacid moiety such as

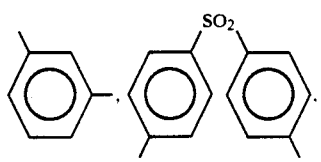

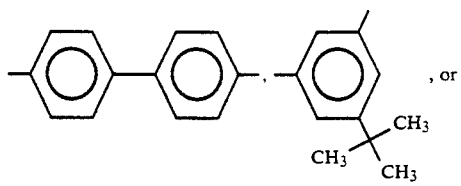, or

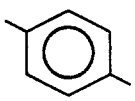

or mixtures thereof, preferably

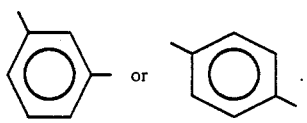

Polyamide-imide materials useful in the present invention contain the repeating unit:

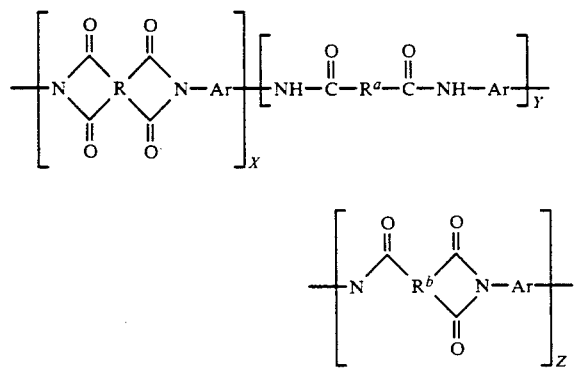

where Ar is defined as above (and may be different in each instance), and R and $R^a$ are as defined above. $R^b$ is any aromatic triacid moeity such as

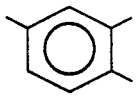

x, y and z are fractions where $x+y+z=1$.

The polyamide-imide materials may also be mixtures of the polyimides and polyamides described above.

The polyamides and polyamide-imides may be prepared by methods well known in the art.

The second type of polymer blended with the first type of polymer is an aromatic polyimide with the following repeating formula:

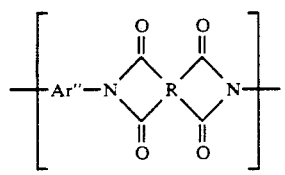

where Ar" is

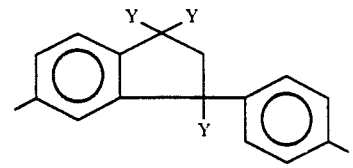

where R is as defined above and —Y is independently an alkyl group having 1-6 carbon atoms or an aromatic group consisting of 6-12 carbon atoms. When each —Y is —CH$_3$ and R is

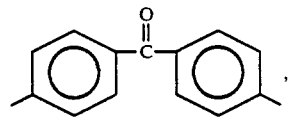

this polymer is commercially available from Ciba-Giegy Company and is generally known as MATRIMID 5218, which is the preferred composition.

The polymers may be mixed in any ratio to achieve the desired properties of the membrane, preferably 10-90% type-1 polymer and 90-10% type-2 polymer, most preferably 25-75% type-1 polymer and 25-75% type-2 polymer. As can be seen from the graph in FIG. 1, the productivity and gas selectivity of different compositions of a blend of an alkyl-substituted polyimide and an aromatic polyimide can be customized to best suit particular applications by selecting the appropriate polymer ratio to yield optimum properties. Not only do the blends achieve surprising and superior gas transport properties, the productivity and selectivity may be conveniently engineered to achieve the desired final properties of the blended polymer membrane.

The preferred polymers utilized in the present invention are miscible with one another at blend ratios of interest for superior membranes, as evidenced by a single composition dependent glass transition temperature (Tg°C.) which is between the highest and lowest glass transition temperatures attributable to respective individual polymer components employed in the blend. To the extent that the polymers are not fully miscible with one another, the resultant membrane will not be uniform and the gas transport properties will, in most cases, be adversely effected.

To prepare membranes in accordance with this invention, the resulting blend solution is cast as a sheet onto a support, or spun through a spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

As used herein and in the accompanying claims (and as will be appreciated by one of ordinary skill in the art), the term "membrane" or "membranous structure" refers, without limitation, to structures used in separation applications, for example, thin films, thick films, composite structures, asymmetric structures, hollow fibers, modules, and like items.

Membranes are used in the separation of H$_2$ from other gasses including N$_2$, CO and CH$_4$; the separation of $CO_2$, $H_2S$ and water vapor from natural gas; and the enrichment of air by nitrogen or oxygen. In addition, hydrogen is recovered from ammonia production plants, and, likewise, hydrogen is recovered from coal gasification processes for the production of synthetic fuel.

The standard unit for measuring the permeability of gases through a dense film membrane is the Barrer, which is defined as follows:

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein the flux (flow rate) in units of $CM^3$/sec, being volume per seconds of permeated gas at standard temperature and pressure,
cm. is the thickness of the film,
$cm^2$ is the area of film, and
cm. Hg is the pressure (or driving force).

The selectivity of a membrane in separating a two-component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rates of passage of the two components determined separately on the same membrane. Rates of passage may be expressed in Barrer (B) units. As an example of selectivity, $\alpha\ O_2/N_2 = 10$ indicates that the subject membrane allows oxygen gas to pass through at a rate ten times that of nitrogen.

The productivity of an asymmetric membrane is measured in GPUs which is defined as follows:

$$GPU = 10^{-6} \times \frac{\text{cm}^3 \text{ (STP)}}{\text{cm}^2 - \text{sec(cm. Hg)}}$$

EXAMPLES

The following examples are illustrative of the polyimide blends and membranes made in accordance with the present invention.

EXAMPLE 1

This example describes the process for producing an asymmetric polyimide blend hollow-fiber gas separation membrane from 25% type-1 polymer and 75% type-2 polymer in which the type 1 polymer is a copolyimide formed from

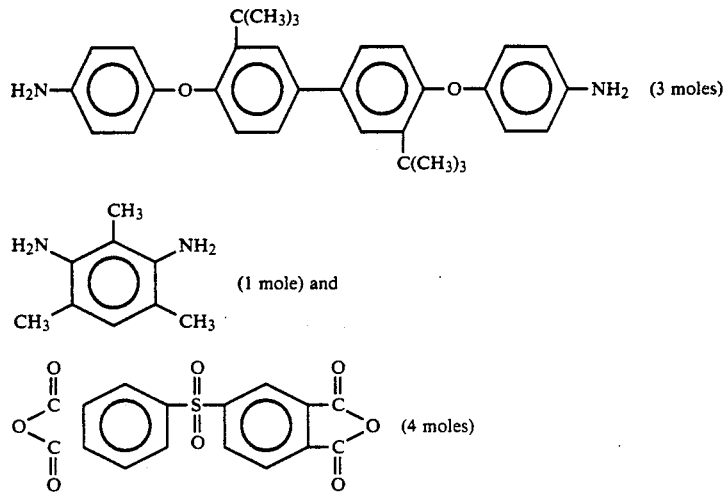

and the type 2 polymer is the polyimide which is the condensation product of 3,3',4,4'-benzophenone tetracarboxylic dianhydride and 5(6)-amino-1-(4'-aminophenyl)-1,3,3'-trimethylindane, commercially available from Ciba-Giegy Corp. as MATRIMID 5218.

A polymer solution containing 28.5% weight content of the 25:75 weight blend and 10% weight tetramethylenesulfone and 1.7% weight acetic anhydride in N-methylpyrrolidone is prepared. The above solution was extruded through a hollow-fiber spinneret with fiber channel dimensions of outer diameter (OD) equal to 559 microns ($5.59 \times 10^{-4}$ m) and inner diameter (ID) equal to 254 microns ($2.54 \times 10^{-4}$ m) at a rate of 140 $cm^3$/hr at 70° C. A solution of 85 weight percent N-methylpyrrolidone in water was injected into the fiber bore at a rate of 52.5 $cm^3$/hr in order to generate the hollow-fiber configuration. The spun fiber passed through an air-gap length of 10 cm at room temperature and ambient pressure into a water coagulant bath maintained at 25° C. The fiber was wound-up on a drum at the rate of 100 meters/minute.

The water-wet fiber was washed with running water at 50° C. for about 12 hours and dehydrated as taught in U.S. Pat. No. 4,080,744 and U.S. Pat. No. 4,120,098. This specifically involved the replacement of water with methanol followed by the replacement of methanol with normal hexane and drying in a vacuum of about 20 inches of mercury. Gas separation modules were prepared by using loops of the hollow fibers in a steel tubing while potting the open ends of the fibers in an epoxy resin to provide feed gas inlet, rejected gas outlet and permeate gas flow through the bores of the hollow fibers. The gas separation module fabrication process is disclosed in details in U.S. Pat. No. 4,863,496.

The asymmetric hollow fibers, prepared as described above were tested for mixed gas $O_2/N_2$(21/79 mole) permeabilities while applying 100 psig (689 KPa) on the shell side of the fibers at room temperature. Results are reported below:

$O_2$ Productivity = 49 GPU $O_2/N_2$ Selectivity = 5.5

The same fibers in the fabricated module form were heat treated at 75° C. for about 16 hours and retested for mixed gas $O_2/N_2$ permeabilities at 100 psig (689 KPa) at room temperature. Results are reported below:

$O_2$ Productivity = 30 GPU
$O_2/N_2$ Selectivity = 6.3

EXAMPLE 2

This example describes the process for producing a composite polyimide hollow-fiber gas separation membrane comprising a blend of 15% type-1 polymer and 85% type-2 polymer as the separating membrane supported on a polyimide substrate. The substrate polymer is a blend of a polyetherimide having the formula

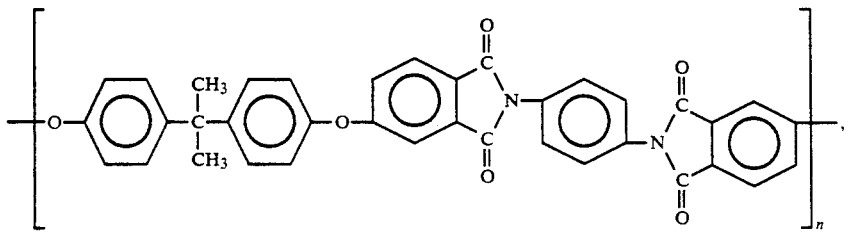

(commercially available from General Electric Co.), and MATRIMID 5218.

A substrate solution containing 90:10 weight blend ratio of ULTEM 1000: MATRIMID 5218 is prepared according to the formulation: 31% by weight blend polymer and 2.3% weight $LiNO_3$, and 9.3% weight tetramethylenesulfone, and 1.9% weight acetic anhydride in N-methylpyrrolidone.

A separating polymer solution containing 15:85 weight type-1:type-2 blend ratio as described in Example 1 is prepared according to the formulation: 27% by weight blend polymer and 8.1% weight tetramethylenesulfone and 1.6% weight N-methylpyrrolidone.

The above solutions were coextruded through a composite fiber spinneret as described in U.S. Pat. No. 5,085,676. The separating layer polymer solution is extruded at a rate of 15 cm$^3$/hr and the substrate polymer solution is extruded at 125 cm$^3$/hr. A solution of 90% weight N-methylpyrrolidone in water is injected to the bore of the fiber at a rate of 52 cm$^3$/hr while the spinneret is maintained at 100° C. The spun bicomponent fiber is passed through an air-gap of 1 cm at room temperature and ambient pressure into a water coagulation bath at 35° C. The composite fiber is wound on a drum at a rate of 100 m/min. The composite fiber is washed and dehydrated by the solvent exchange method as described in Example 1.

The composite fibers were potted in an epoxy resin at both ends inside a straight steel tubing to provide gas feed through the bore of the hollow fibers. The fibers were tested for mixed gas $O_2/N_2$ (21/79 mole) at 100 psi and 21° C. The fibers exhibited the following separation performance while producing an inerts enriched product stream containing 95% $N_2$:

$O_2$ Productivity = 120 GPU
$O_2/N_2$ Selectivity = 3.6

The composite hollow fibers were treated to seal defects protruding through the dense outer gas separating layer as taught in U.S. Pat. No. 4,230,463. This specifically involved contacting the outer surface of the fibers with a hexane solution containing 1% weight SLYGARD 184 for a period of 30 minutes at room temperature and at a vacuum of 20 inches mercury in the fiber bore. The hexane was drained and the hollow fibers were allowed to air-dry. The above treated fibers were tested for mixed gas $O_2/N_2$ (21/79 mole) at 100 psi and 21° C. The fibers exhibited the following separation performance while producing an inerts enriched product stream containing 95% $N_2$:

$O_2$ Productivity = 36 GPU
$O_2/N_2$ Selectivity = 6

EXAMPLE 3

This example describes the process for producing a composite polyimide blend hollow-fiber separation membrane from 25% type-1 polymer and 75% type-2 polymer, in which the type-1 polymer and the type-2 polymer are the same as Example 1. A separating polymer solution containing 25:75 weight blend ratio is prepared according to the formulation: 25% by weight blend polymer plus 7.5% weight tetramethylenesulfone and 1.5% weight acetic anhydride in N-methylpyrrolidone. This separating polymer solution was extruded at a rate of 15 cm$^3$/hr and the same substrate polymer solution described in Example 2 was extruded at 125 cm$^3$/hr through the same coextrusion spinneret also described in Example 2. A solution containing 90% weight N-methylpyrrolidone in water was injected to the bore of the fiber at a rate of 50 cm$^3$/hr while the spinneret was maintained at 100° C. The spun bicomponent fiber was passed through an air-gap of 3.5 cm at room temperature and ambient pressure into a water coagulation bath at 24° C. The composite fiber was wound on a drum at a rate of 100 m/min. The composite fiber was washed and dehydrated by the same procedure as described in Example 2. Gas Separation modules as set forth in Example 2 to provide gas feed through the bore of the hollow fibers were fabricated. The fibers were tested for mixed gas $O_2/N_2$ (21/79 mole) at 100 psi and 21° C. The fibers exhibited the following separation performance while producing a product stream containing 95% $N_2$:

$O_2$ Productivity = 43 GPU
$O_2/N_2$ Selectivity = 5.9

EXAMPLE 4

A composite polyimide blend hollow-fiber separation membrane from 25% type-1 polymer and 75% type-2 polymer, in which the type-1 polymer and the type-2 polymer are the same as Example 1, was tested for a variety of gas separations as follows: A separating polymer solution containing 25:75 weight blend ratio is prepared according to the formulation: 25% by weight blend polymer plus 7.5% weight tetramethylenesulfone and 1.5% weight acetic anhydride in N-methylpyrrolidone. This separating polymer solution was extruded at a rate of 12 cm$^3$/hr and the same substrate polymer solution described in Example 2 was extruded at 92 cm³/hr through the same coextrusion spinneret also described in Example 2. A solution containing 90% weight N-methylpyrrolidone in water was injected to the bore of the fiber at a rate of 37 cm³/hr while the spinneret was maintained at 100° C. The spun bicomponent fiber was passed through an air-gap of 2.5 cm at room temperature and ambient pressure into a water coagulation bath at 24° C. The composite fiber is wound on a drum at a rate of 80 m/min. The composite fiber was washed and dehydrated by the same procedure as described in Example 2. Gas separation modules as set forth in Example 2 to provide gas feed through the bore of the hollow fibers were fabricated. The fibers were tested for mixed gas $O_2/N_2$(21/79 mole) at 100 psi and 21° C. The fibers exhibited the following separation performance while producing a product stream containing 95% $N_2$:

$O_2$ Productivity=85 GPU
$O_2/N_2$ Selectivity=2.2

The composite hollow fibers were treated to seal defects in the same manner as Example 3. The above-treated fibers were tested for gas separations at 100 psi and 21° C. The fibers exhibited the following separation performance.

$O_2$ Productivity=18.3 GPU
$N_2$ Productivity=2.75 GPU
$O_2/N_2$ Selectivity=6.65
$H_2$ (single gas) Productivity=251 GPU
He (single gas) Productivity=236 GPU
$N_2$ (single gas) Productivity=2.5 GPE
$CH_4$ (single gas) Productivity=2.4 GPU
$H_2/CH_4$ (single gas) Selectivity=105

EXAMPLE 5

This example describes the process for producing the preferred asymmetric polyimide blend hollow-fiber gas separation membrane in which the type-1 polymer is a polyimide formed from

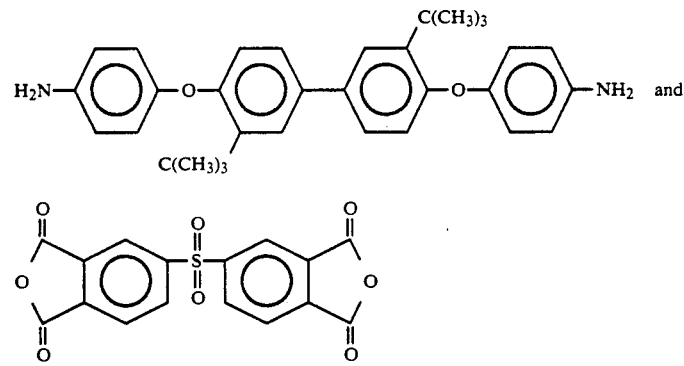

and the type-2 polymer is MATRIMID 5218.

A polymer solution containing 25% of a 75:25 type-1:type-2 blend and 7.5% weight tetramethylenesulfone and 1.5% weight aceticanhydride in N-methylpyrrolidone was extruded through a spinneret having the same fiber channel dimensions as described in Example 1 at a rate of 160cm³/hr at 70° C. A solution containing 90% volume N-methylpyrrolidone in water was injected into the bore of the hollow fiber at a rate of 52.5 cm³/hr. The nascent fiber traveled through an air-gap length of 5 cm into a water coagulant bath maintained at 22° C. and was wound-up at a rate of 100 m/min.

The fibers were washed, dehydrated and tested for mixed gas $O_2/_2$ permeabilities while applying 100 psig on the shell side of the fibers as described in Example 1. The results are summarized below:

$O_2$ Productivity=40 GPU
$O_2/N_2$ Selectivity=4.6

The outer surfaces of the above fibers were treated with a 1% weight SYLGARD 184 solution in FREON-113 (1,1,2 trichloro-1,1,2 trifluoroethane) for 30 minutes at room temperature and at a vacuum of 20 inches mercury in the fiber bore. The FREON-113 was drained and the fibers were allowed to air-dry. The above-treated fibers were retested for mixed gas $O_2/N_2$ at 100 psig pressure at 21° C. The results are summarized below:

$O_2$ Productivity=35 GPU
$O_2/N_2$ Selectivity=6.

COMPARATIVE EXAMPLE 1

This example describes the material and processes by which, asymmetric ULTEM-1000 polyetherimide and MATRIMID blend hollow fibers are produced:

A polymer solution containing 31% weight content of 75:25 ULTEM-1000: MATRIMID 5218 blend polyimide and 2.3% $LiNO_3$ and 9.3% tetramethylenesulfone and 1.6% acetic anhydride and 0.3 % acetic acid in N-methylpyrrolidone ("NMP") was prepared. This solution was extruded through a hollow fiber spinneret having the same dimensions as described in Example 1 at a rate of 143 cm³/hr at 70° C. A solution of 90% weight NMP in water was injected into the fiber bore at a rate of 52.5 cm³/hr in order to generate the hollow fiber configuration. The spun fiber passed through an air-gap length of 10 cm into a water coagulant bath maintained at 21° C. and was wound-up on a drum at a rate of 100 m/min.

The fiber was washed and dehydrated according to the procedures described in Example 1 and tested for mixed gas $O_2/N_2$(21/79 mole) permeabilities while applying 100 psig on the shell side of the fibers at room temperature. Results are reported below:

$O_2$ Productivity=21 GPU
$O_2/N_2$ Selectivity=2.1

The same fibers were treated to seal defects as described in Example 2 by contacting the outer surface of the fibers with a hexane solution containing 1% weight "Sylgard 184" for a period of 30 minutes at room temperature and at a vacuum of 20 inches mercury applied to the bore of the fibers. The above treated fibers were tested for mixed gas $O_2/N_2$ at 100 psi and 21° C. The fibers exhibited the following performance:

$O_2$ Productivity=14 GPU
$O_2/N_2$ Selectivity=6.4

It is clear from this comparative example that the permeation properties of the ULTEM-1000: MA-TRIMID 5218 blend fibers are not as attractive as compared to the permeation properties of the inventive blend fibers of components.

EXAMPLE 6

This example describes the materials and the processes by which asymmetric polyimide and polyamide blend fibers are produced.

A solution containing 24% weight content of a 90:10 weight blend of MATRIMID 5218 and the polyamide produced from m-phenylenediamine and 5-tertiary-butyl-isophthaloylchloride, 4.8% tetramethylenesulfone, and 4.8% THERMOGUARD T-230 (available commercially from M & T Chemicals Co., and disclosed in U.S. Pat. No. 4,983,191) was prepared in N-methylpyrrolidone solvent. This solution was extruded through a hollow fiber spinneret having the same fiber channel dimensions as disclosed in Example 1 at a rate of 143 cm$^3$/hr at 100° C. A solution of 80% by volume of 1:1 N-methylpyrrolidone: dimethylsulfoxide in water was injected into the fiber bore at a rate of 60 cm$^3$/hr in order to generate the hollow fiber configuration. The spun fiber passed through an air-gap length of 10 cm at room temperature into a water coagulant bath maintained at 21° C. and was wound-up on a drum at the rate of 75 meter/minute. The fibers were washed and dehydrated according to the procedures described in Example 1 and tested for mixed gas O$_2$/N$_2$(21/79 mole) permeabilities while applying 100 psig on the shell side of the fibers at room temperature. Results are reported below:

O$_2$ Productivity = 78 GPU
O$_2$/N$_2$ Selectivity = 2.8

The same fibers were treated to seal defects as described in Example 2 by contacting the outer surfaces of the fibers with a polydimethylsiloxane (with a fluid viscosity of 0.65 centistokes available from Dow Corning) solution containing 1% weight SYLGARD 184 for a period of 30 minutes at room temperature and a vacuum of 20 inches mercury applied to the bore of the hollow fibers. The above treated fibers exhibited the following performance:

O$_2$ Productivity = 18 GPU
O$_2$/N$_2$ Selectivity = 5.6.

What is claimed is:

1. A membranous structure for gas separation comprising a miscible blend of at least two polymers having different molecular structures, a first said polymer is selected from a group consisting of the following polyimides, polyamides and polyamide-imides:

(a) Polyimide materials useful in the present invention contain the repeating unit:

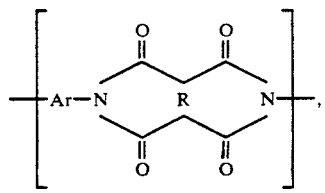

where —Ar— is 0%–99% of any aromatic diamine moiety and 1–100% of an aromatic diamine moiety having the following formula:

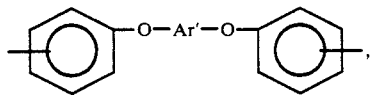

where —Ar'— is

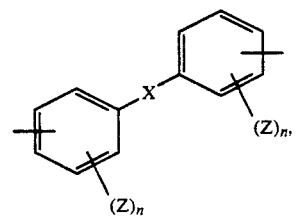

where X = nothing or R'; —R'— is

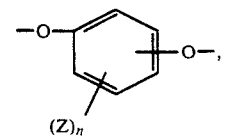

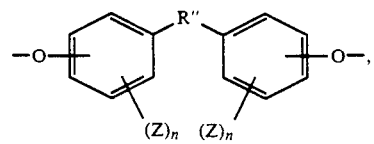

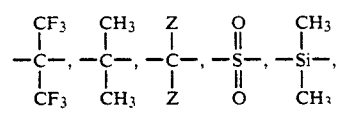

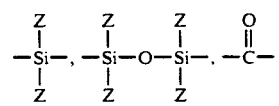

or mixtures thereof, where Z is independently —H, alkyl groups having 1 to 6 carbon atoms, aromatic groups having 6 to 12 carbon atoms, or halogen groups such as —F, —Cl, —Br, or —I, where n is an integer from 0 to 4; R'' is

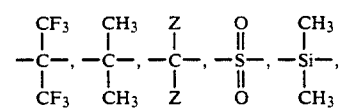

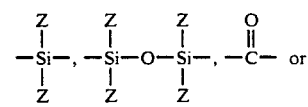

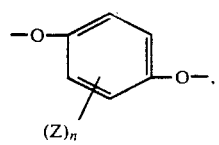

or mixtures thereof; and

R is 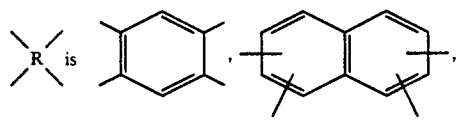

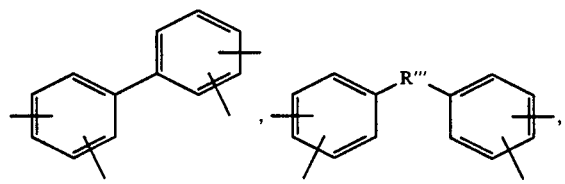

or mixtures thereof; where R''' is

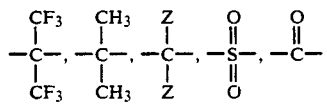

or mixtures thereof;

(b) Polyamide materials useful in the present invention contain the repeating unit:

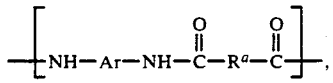

where Ar is defined above and $R^a$ is any aromatic diacid moiety;

(c) Polyamide-imide materials useful in the present invention contain the repeating unit:

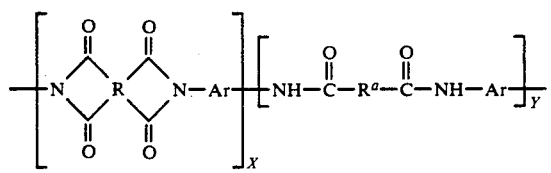

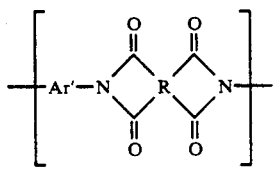

where Ar independently, R and $R^a$ are as defined above, $R^b$ is any aromatic moeity and x, y and z are fractions where x+y+z=1; or the polyamide-imide materials may also be mixtures of the polyimides and polyamides described above; and a second said polymer being a polyimide containing the following repeating unit:

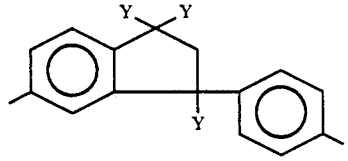

where Ar' is

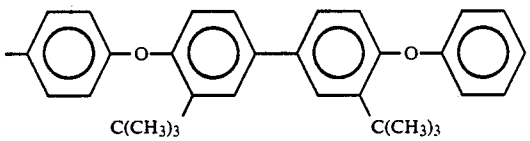

and R is as defined above and Y is an alkyl group having 1-6 carbon atoms or an aromatic group having 6-12 carbon atoms.

2. The structure of claim 1 wherein the first polymer is a polyimide and Z is a tertiary butyl group.

3. The structure of claim 2 wherein the first polymer is a polyimide in which Ar is:

4. The structure of claim 1 wherein the second polymer is MATRIMID 5218.

5. A process for separating one or more gases from a gaseous mixture comprising bringing said gaseous mixture into contact with a first side of the gas separation membrane of claims 1 to 4 in a manner to cause a portion of the mixture to pass through the membrane to a permeate side, the resulting gas mixture on the permeate side being enriched in one or more component over that of the mixture on the first side.

* * * * *